United States Patent [19]

Lillquist

[11] Patent Number: 4,484,059
[45] Date of Patent: Nov. 20, 1984

[54] INFRARED SENSOR FOR ARC WELDING

[75] Inventor: Robert D. Lillquist, Schenectady, N.Y.

[73] Assignee: General Electric Company, Schenectady, N.Y.

[21] Appl. No.: 371,704

[22] Filed: Apr. 26, 1982

[51] Int. Cl.³ ............................................. B23K 9/10
[52] U.S. Cl. ........................... 219/130.01; 219/124.34; 219/130.21
[58] Field of Search ...................... 219/130.01, 124.34, 219/130.21, 124.02; 356/43, 45, 47, 48

[56] References Cited

U.S. PATENT DOCUMENTS

| 3,299,250 | 1/1967 | Vilkas et al. | 219/130.21 |
| 3,370,151 | 2/1968 | Normando | 219/124.34 |
| 3,501,237 | 3/1970 | Lide | 356/45 |
| 3,627,972 | 12/1971 | Iceland et al. | 219/130.21 |
| 3,666,949 | 5/1972 | DeFalco et al. | 219/130.21 |
| 4,280,137 | 7/1981 | Ashida et al. | 219/124.34 |
| 4,302,655 | 11/1981 | Edling | 219/130.32 |
| 4,316,075 | 2/1982 | Isoya et al. | 219/124.22 |
| 4,316,076 | 2/1982 | Balfanz | 219/124.22 |

FOREIGN PATENT DOCUMENTS

| 2608720 | 9/1977 | Fed. Rep. of Germany | 219/124.34 |
| 2749117 | 5/1979 | Fed. Rep. of Germany | 219/124.34 |
| 429911 | 10/1974 | U.S.S.R. | 219/124.02 |
| 548392 | 4/1977 | U.S.S.R. | 219/124.34 |

OTHER PUBLICATIONS

"Development of Weld Pool Imaging Techniques for the Adaptive Control of Gas Tungsten Arc Welding", S. Hanumanth Rao, Thesis Presented to The Ohio State University, 1981.

Primary Examiner—C. C. Shaw
Attorney, Agent, or Firm—Lawrence D. Cutter; James C. Davis, Jr.; Marvin Snyder

[57] ABSTRACT

An infrared detector is provided with spectral filtering means for direct observation of the arc region during electric arc welding operations. The filter permits direct observation of the weld pool by suppressing almost all of the infrared radiation produced by the arc itself. Were this not the case, the electrical signal output from the infrared detector is totally obscured by the intense infrared radiation from the arc and would thus not permit sufficiently high resolution infrared measurements to be made on the weld pool and the work piece.

11 Claims, 3 Drawing Figures

INFRARED SENSOR FOR ARC WELDING

BACKGROUND OF THE DISCLOSURE

This invention relates to sensors for use in electric arc welding processes. More particularly, the present invention relates to infrared sensors capable of directly viewing the arc region and surrounding workpiece areas.

In various electric arc welding processes, it is desirable to be able to determine a number of weld parameters during the welding operation itself. This is particularly important for automated welding processes. At present, automated welding processes have been essentially limited to spot welding processes. However, continued development of automated welding processes, particularly those processes carried out by general purpose manufacturing robots, require greater amounts of continuous information relevant to the quality of the weld that is being made. This information must, of necessity, be furnished on a real time basis, as the weld is being made. In short, there is a significant need for feedback control mechanisms based on such information to control certain parameters of the welding process. These parameters include arc current, arc voltage, electrode distance to the workpiece, lateral torch positioning and rate of torch movement along the length of the weld. Another significant variable that is extremely useful in determining the ultimate strength and quality of a welded joint is the penetration depth of the weld. This variable describes the depth that the weld fuses into the root of the joint. Because a stress joint is likely to fail at points where incomplete penetration has occurred, the continuous control of weld penetration is a significantly desirable objective in any automated welding process. The most influential factor determining weld depth penetration is the heat input per unit length of the weld pass. Increasing the arc current or decreasing the travel speed can, for example, result in greater penetration. However, other factors beyond the direct control of the welder, such as joint design and fit-up, also have important influences on weld depth penetration. Thus, it becomes highly desirable that automatic welders and processes employ some means of detecting penetration and of adjusting the heat supplied to the weld joint, to ensure proper quality for the finished weld.

Several different approaches have been taken in the past to determine weld depth penetration and quality. The most direct indication of heat input rate during a welding operation is the temperature of the workpiece at some fixed point relative to the arc. Thus, conventional temperature sensors have been employed to measure changes in such temperatures and, through appropriate feedback controls, changes in controllable parameters have been made to occur. These parameters have included arc current, torch travel speed and arc length. In the Sciaky weld penetration control, infrared sensors continuously monitor the heated zone on the underside of the joint that is being welded. This process possesses the significant disadvantage that uninhibited access to the underside of the workpiece is required. Additionally, critical alignment requirements necessitate the synchronization of the sensor and its movements with the welding torch movements. Thus, in the Sciaky control, there is no direct observation of the weld pool itself.

Other work in this field has been reported in a progress report titled "Improvement of Reliability of Welding by In-process Sensing and Control(Development of Smart Welding Machines for Girth Welding of Pipes)" submitted to the Department of Energy in June, 1981 by José Converti, et al. This report describes initial experiments conducted using contact sensors (thermocouples) to probe the temperature distribution near the weld puddle and seam. Attempts to use near infrared photodiodes, described therein, for remote temperature sensing were not successful due to significant optical interference from plasma radiation reflected from the metal surface. In particular, Converti et al. propose using a simple optical filter to reduce the radiation from the plasma arc through the use of materials similar to conventional welders' goggles.

A significantly different technique, based on contact thermometry has been developed by NASA for aluminum welding. A constantan wire, making a sliding contact with the workpiece, forms one leg of a thermocouple circuit. This contact occurs near the weld on the torch side of the joint. Such a system appears to function more successfully as a penetration control device on thin (0.125") aluminum workpieces rather than on thicker pieces where complete penetration is necessary.

In short, prior workers in the field of automated arc welding processes have yet to provide high resolution data and detailed information about the weld pool and the area immediately surrounding the arc. However, the instant inventor has discovered significant information concerning the spectral distribution of the infrared radiation from the arc itself, thus enabling the construction of an arc welding sensor providing hither-to unavailable information concerning weld quality, on a continuous, real-time basis, from the critically important region near to the arc and weld pool.

SUMMARY OF THE INVENTION

In accordance with a preferred embodiment of the present invention, an infrared sensor for arc welding monitoring comprises means for directing infrared radiation from the arc region through focussing means for the infrared radiation and thence through a filter selectively passing infrared radiation having a wavelength greater than about 3 microns. The present sensor further comprises infrared detection means operating to receive the radiation transmitted through the filter means to produce electrical signals in response to the intensity of the infrared radiation impinging upon the detector. In a preferred embodiment of the present invention, the infrared detector comprises a linear array of pyroelectric detector cells operating to provide electrical signals indicative of temperature profile measurements in the immediate vicinity of the arc and weld pool. In accordance with another preferred embodiment of the present invention, the sensor is mechanically attached to the arc torch and, accordingly, moves along therewith. Accordingly, in this embodiment, the necessity for a second, traveling sensor arm and associated synchronization devices and circuitry, are no longer required. Furthermore, in still another embodiment of the present invention, the detector and filter are removable from the instant apparatus to permit manual focussing and alignment of the sensor using visible light optics, a feature which is particularly useful during setup operations.

Accordingly, it is an object of the present invention to provide an electric arc welding sensor for producing radiation and temperature information from the vicinity of the arc and weld pool.

It is also an object of the present invention to provide feedback control means to control various arc welding torch parameters such as current rate of travel, arc length and depth of penetration.

Lastly, it is an object of the present invention to facilitate automated welding processes.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
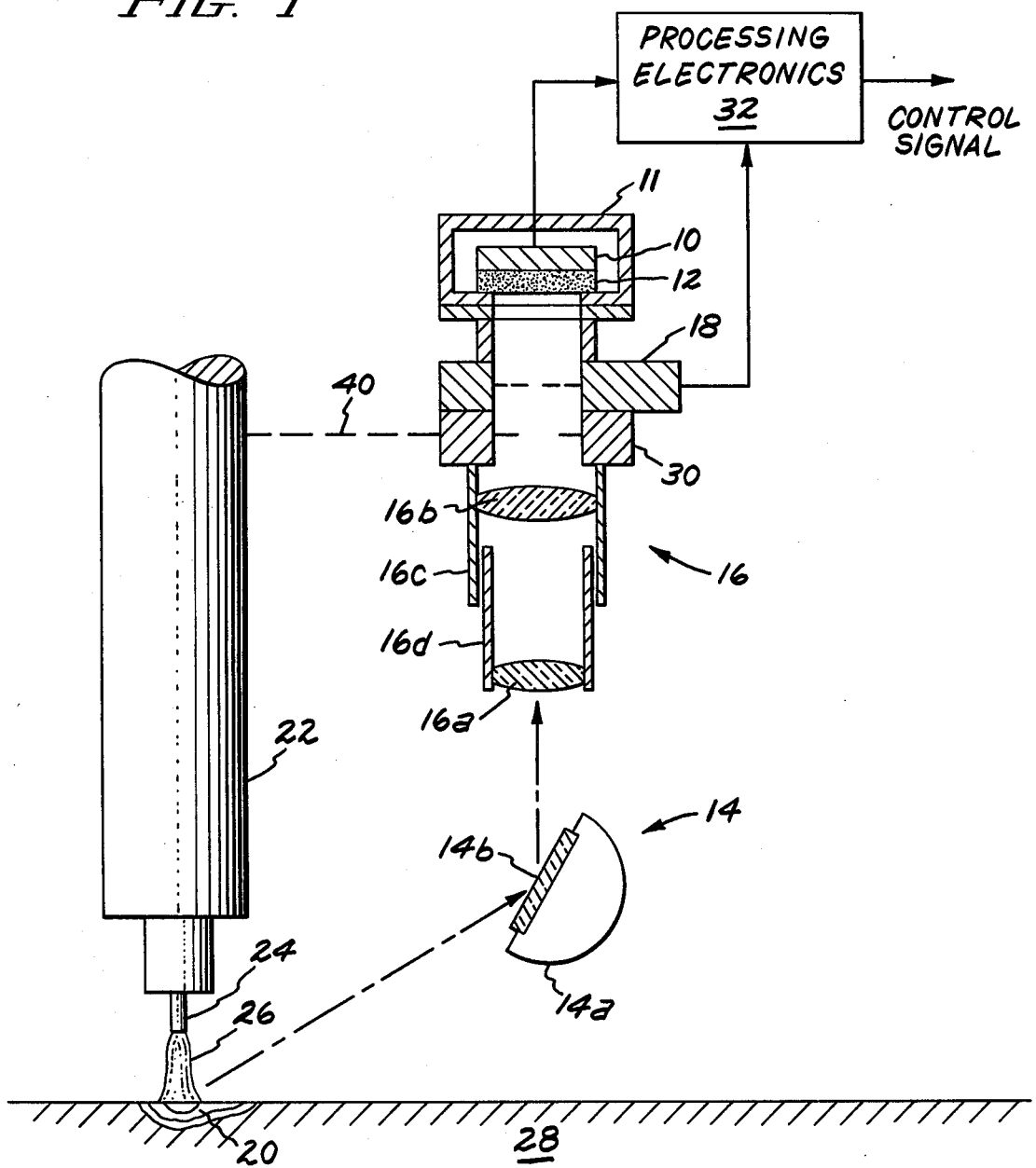
FIG. 1 is a schematic side elevation view of the sensor of the present invention together with an electric arc torch to which it is mounted.

FIG. 1 illustrates a preferred embodiment of the present invention. In particular, the present invention comprises infrared detector 10, filter 12, optical directing means 14 and focussing means 16. These elements and other elements which are preferably employed in the present invention are discussed in detail below.

Infrared detector 10 receives focussed and filtered infrared radiation from weld pool 20 in workpiece 28. The weld pool is formed as a result of an electric arc extending from electrode tip 24 of arc welding torch 22, to metal workpiece 28. The detector of the present invention should be sensitive to infrared radiation having a wavelength greater than about 3 microns. Generally, the detector sensitivity extends from about 3 to about 14 microns with the preferable sensitivity range being between approximately 3 and approximately 7 microns. The detector should also preferably exhibit a minimum frequency response of approximately 50 Hz. Additionally, the detector should be stable at an operating temperature of approximately 25° C. Several specific forms of detectors may be employed, none of which require cooling, such as by cryogenic liquid, for their proper operation. In particular, detector 10 may comprise a 32 to 128 element self-scanning pyroelectric linear array detector such as those available from Spiricon, Inc., 2600 North Main, Logan, Utah 84321. These linear detector arrays are particularly for providing linear temperature profiles. This profile can be employed to determine puddle dimensions and is particularly useful for welds between thin sheets of material. Additionally, detector 10 may comprise a single element photoconductive-type detector employing lead selenide or indium antimonide photoconductive materials. Such single element detectors may be employed to receive infrared radiation information from a fixed point in the weld pool region and is particularly useful for monitoring high penetration welds. Single element pyroelectric detectors may also be employed for this purpose. Lastly, detector 10 may comprise a two-dimensional scanning array pyroelectric cell or photoconductive-type detector. Such detectors are preferable for certain special purpose applications where it is desirable to obtain high resolution thermal data from the entire weld zone.

Much of the success of the instant arc welding sensor is attributable to the fact that it is a torch side instrument. Such instruments generally lack the ability to provide sufficiently significant levels of thermal data resolution because of the extremely bright and intense infrared radiation produced by the arc itself. This radiation is of such a high intensity that it effectively jams other infrared radiation produced. However, the instant inventor has discovered that, for a number of different welding processes, the bandwidth of the infrared radiation generated within the arc is limited to wavelengths below approximately 3 microns. Accordingly, applicant's invention employs filter 12 which selectively passes infrared radiation having wavelengths greater than about 3 microns. In this way, infrared "noise" from arc 26 is very greatly attenuated. The presence of filter 12 permits the entire weld pool region to be monitored without significant interference from arc 26. Filter 12 may comprise an infrared long pass filter with a lower cut-on wavelength of between 3 or 4 microns. Additionally, filter 12 may comprise a band pass type filter transmitting infrared radiation having wavelengths between about 3 and about 7 microns. Additionally, it should also be noted that infrared radiation having wavelengths up to about 14 microns contains useful information about the nature and quality of the weld being processed.

In a preferred embodiment of the present invention, detector 10 and filter 12 are mounted within detachable head 11. This is a particularly advantageous feature of the present invention in that removal of head 11 permits manual inspection of the weld area using visible light optics. Thus, an operator of arc welding torch 22 may easily remove head 11 to visually align and adjust the other optical elements in the present invention. It is contemplated that this adjustment would normally be done during an initial set up time and would seldom require manual intervention thereafter.

Although the sensor of the present invention could be mounted so that it is fixedly aimed at the weld zone, it is preferable (for the purposes intended herein) to employ optical directing means 14 for receiving infrared radiation from the arc region and reflecting it toward detector 10. Accordingly, beam deflector 14 preferably comprises a gold plated mirror or sapphire prism. This form of optical directing means permits the sensor to be mounted colinearly with welding torch 22 while providing detector 10 optical access to the entire weld zone, including pool 20. Beam deflector 14 is preferably mounted in a lockable ball and socket joint to facilitate optical alignment. In particular, beam deflector 14 may comprise an infrared reflecting mirror 14b mounted upon a base 14a which may comprise, for example, a cylinder or sphere having a flat face filed or ground thereon. Although not specifically shown in FIG. 1, beam deflector 14 is mechanically attached to either torch 22 or to the fixed portion of the sensor assembly. This permits the torch and the entire sensor assembly to travel as a single unit. The main sensor assembly is shown schematically as being mechanically attached to torch 22 by means of lines 40. This attachment is by any convenient mechanical means including, but not limited to, clamps, bolts or other convenient supports.

The present invention also comprises focussing means 16 for receiving infrared radiation from beam deflector 14 and for focussing the radiation on detection means 10. Focussing assembly 16 preferably comprises a simple or compound sapphire lens or other lens system having a depth of field sufficient to resolve the weld zone. A lock for holding the focussing adjustment fast is also preferred. Focussing means 16 might, for example, comprise movable lens 16a mounted in movable collimator 16d. Collimator 16d is slidably disposed within fixed collimator 16c which also houses rear, fixed lens 16b. Movement of collimator 16d and lens 16a acts to provide the requisite focussing. It should be noted that while transmissive optical devices are indicated in FIG. 1 for focussing means 16, it is also possible to provide reflective optical focussing means, such as those found in Cassegrain optical systems. It should also be noted herein that the use of the term "optical" includes not only the visible spectrum but also infrared spectral regions.

Additionally, the sensor of the present invention preferably includes an iris field stop 30. This may consist of an adjustable optical iris diaphragm having an interleaved construction similar to those found in many cameras. Iris field stop 30 is used to limit the area viewed by the sensor. Accordingly, it's primary function is to block the direct thermal radiation from the torch tip.

Additionally, in the case that detector 10 comprises a pyroelectric detector, it is also preferable to employ chopper 18. This device mechanically modulates the radiation incident upon sensor head 11 allowing the infrared detector to operate in an alternating current mode. The chopper also provides an inherent thermal reference source and timing synchronization. Any compact tuning fork or rotary chopper design may be employed. Such choppers are conventionally known and are available from the electronics division of Bulluva Watch Company, Inc., 61-20 Woodside Avenue, Woodside, N.Y. 11377. Both tuning forks, rotary and other chopper designs, are obtainable therefrom.

The output of detector 10 is in the form of an analog signal whose level is indicative of the intensity of infrared radiation impinging thereon. Pyroelectric detectors typically offer self-scanning features over a range of from about 32 to about 128 separate detector elements. In such cases, the output signal is a sequence of analog pulses whose values are indicative of the level of infrared radiation impinging upon the detector from a linear array of points along, around or across the weld seam. The analog signal from detector 10 together with synchronization signals from chopper 18 are provided to an electronic processing circuit which provides one or more control signals to arc welding torch 22. These signals may control lateral positioning, current level or travel rate along the seam weld.

The electrical signal produced by detector 10 may be employed to serve several functions. First, the detector and the optical direction means may be positioned so as to provide temperature profile measurements across the seam at the weld site. Such an alignment provides temperature profile information which is particularly useful in determining depth of weld penetration. Second, the sensor may be positioned so that a temperature profile across the seam but behind the weld is provided. This temperature profile is particularly useful for determining the quality of a completed weld segment. In this measurement, symmetry of the profile is a particularly advantageous factor in determining the weld. Thirdly, the sensor may be positioned so that a temperature profile along the weld seam, rather than across it, is produced. Thus, such positioning produces temperature profile information indicative of the cooling rate occurring behind the weld pool. Thus, this provides yet another means for determining weld quality. Lastly, seam tracking information may be provided as is more particularly disclosed in concurrently-filed U.S. patent application Ser. No. (RD-14,265) which is also assigned to the assignee of the present invention.

Figure 2:
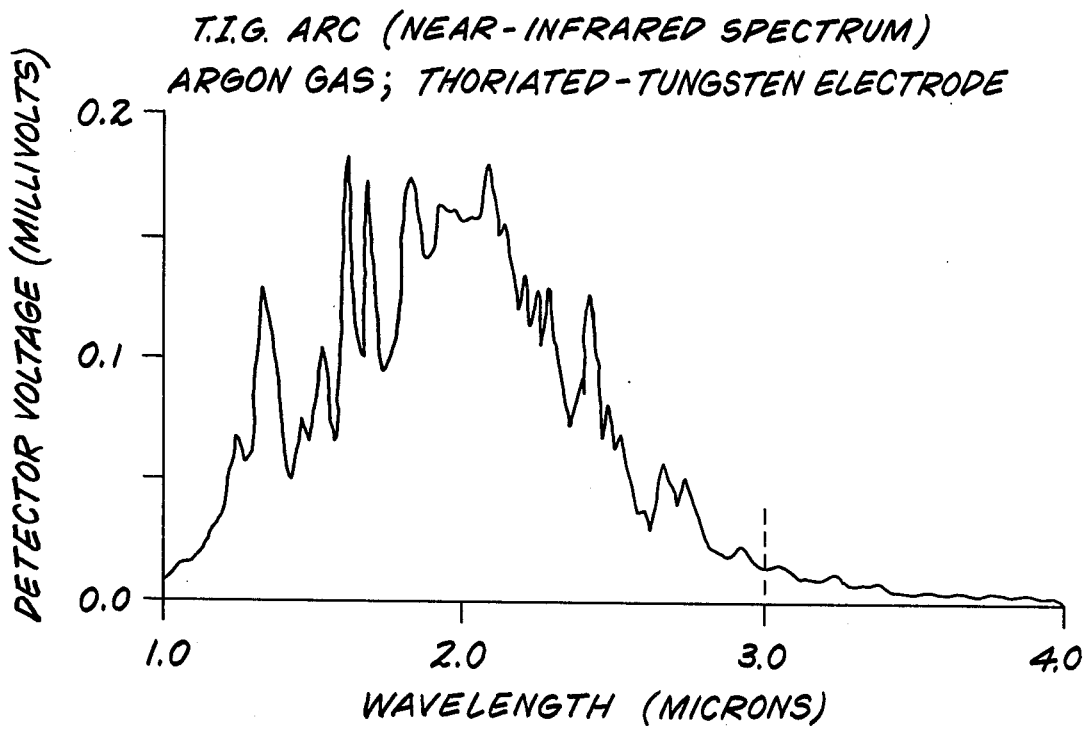
FIG. 2 is a graph of detector output voltage as a function of wavelength for a welding process employing argon gas and a thoriated tungsten electrode.
Figure 3:
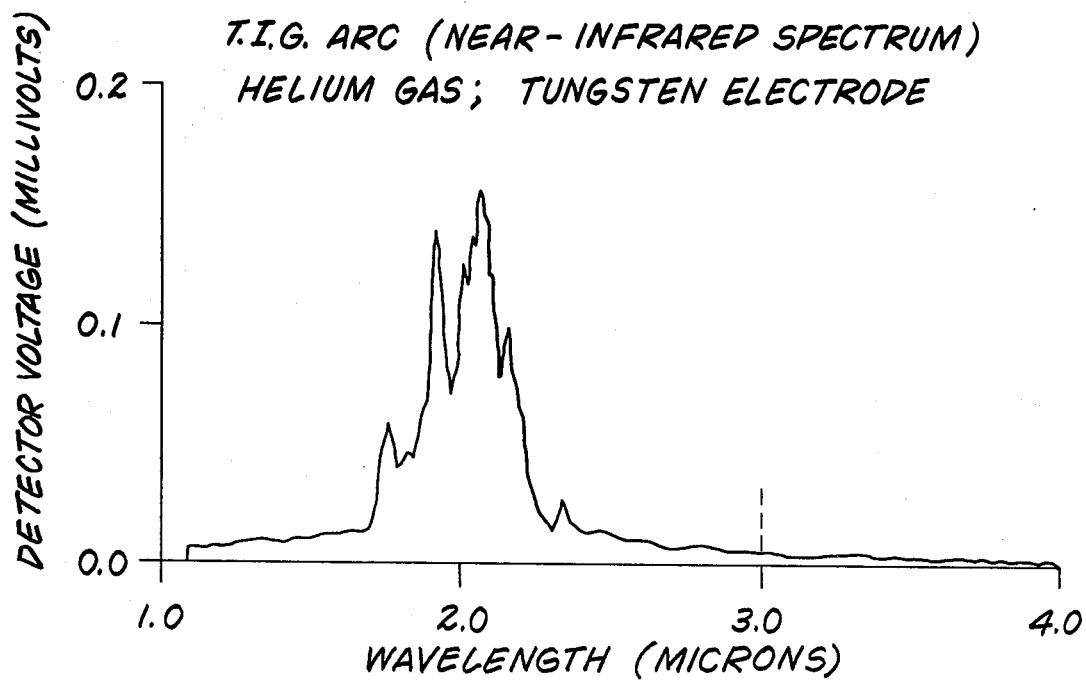
FIG. 3 is a graph similar to that shown in FIG. 2 for a welding process employing helium gas and a tungsten electrode.

The instant arc welding sensor exhibits particular advantages because of the presence of infrared filter 12. As pointed out above, the instant inventor has observed that in several different welding processes, the infrared radiation from the arc itself is confined to a relatively narrow band of electromagnetic spectral frequencies. While the specific frequency band varies with the specific electrode material and inert gas employed, it has been generally found that the infrared radiation produced by the electric arc generally does not exhibit a wavelength greater than approximately 13 microns. In particular, FIG. 2 illustrates a plot of detector output voltage in millivolts as a function of wavelength for a tungsten inert gas (T.I.G.) arc. The inert gas employed was argon and the electrode material employed was thoriated tungsten. A similar plot is shown in FIG. 3 which illustrates the near infrared spectral distribution of a tungsten inert gas arc in which the inert gas employed was helium and the electrode material substantially comprised only tungsten itself. Again, it is seen that the infrared radiation from the arc itself is somewhat bandwidth limited centering around a wavelength of about 2 microns, and extending from about $1\frac{1}{2}$ to about $2\frac{1}{2}$ microns. Thus, for this form of inert gas arc welding an even wider bandwith filter 12 may be employed.

Experiments based upon the above-mentioned principles have been conducted and, in particular, measurements have been made in two specific infrared bands, namely that between 4.5 and 5.5 microns and between 7 and 14 microns. These experiments were conducted using an AGA 780-dual Thermovision imaging infrared radiometer. This instrument produces an image in which the display brightness level or gray scale corresponds to the viewed object's local radiance level. Arc gap varied between $\frac{1}{8}''$ and $\frac{1}{4}''$ with welding current varying from about 40 to about 60 amperes. Argon purge gas was also used in these experiments. Representative images were stored on digital magnetic tape and their viewing indicated several interesting features. In particular, the arc was essentially transparent, although not totally invisible, in both of the infrared bands in which measurements were taken. Furthermore, image quality appeared to be clearly superior in the longer wavelength region between 7 and 14 microns. It is thought that this increased image quality is due, at least in part, to the increased bandwidth in this region which allows more radiant energy to be received. Furthermore, the radiant emissive intensity map of the workpiece in both the infrared regions corresponded well to local surface temperature distribution. Lastly, low sensitivity settings on the instrument on the radiometer employed indicated that room temperature infrared detectors are employable without the need for supplementary cryogenic cooling apparatus.

Accordingly, from the above it may be appreciated that the present invention provides an infrared sensor for use in arc welding systems. In particular, it is seen that the present invention provides a torch side instrument, moving with the torch and specifically capable of high resolution infrared measurements of the arc weld pool. The present invention also offers the advantage of alignment and adjustment by means of visible wavelength spectrum direct observation. Furthermore, it is seen that the present invention is applicable not only to gas tungsten arc welding but also to gas metal arc welding. Furthermore, access to the underside of the weld is not a requisite in the present invention. And lastly, the present invention may be mounted directly on the arc torch thereby eliminating the need for a separate following instrument arc.

While the invention has been described in detail herein, in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An infrared sensor for an electric arc welder in which an electric welding arc is struck between a torch and a workpiece, said sensor comprising:
   infrared detection means for receiving infrared radiation from the vicinity of said welding arc and producing electrical signals in response to the intensity of infrared radiation impinging on said detection means; and
   filter means disposed with respect to said infrared detection means so that said infrared radiation impinging thereon passes through said filter means and wherein said filter means exhibits a cutoff wavelength greater than about 3 microns, whereby emitted rather than reflected infrared radiation is detected from the vicinity of the arc.

2. The welding sensor of claim 1 in which said infrared detection means comprises a linear array of pyroelectric detector cells.

3. The sensor of claim 1 further including focussing means disposed in the optical path between said arc and said detection means for focussing infrared radiation on said detection means.

4. The sensor of claim 3 further including chopper means disposed in the optical path between said detection means and said focussing means.

5. The sensor of claim 3 further including iris means for controlling the amount of infrared radiation impinging upon said detection means, said iris means being disposed between said detection means and said focussing means.

6. The sensor of claim 3 in which said focussing means comprises a reflective optical system.

7. The sensor of claim 1 in which said detection means and said filter means are removable from said sensor to permit visible light viewing and alignment of said sensor.

8. The sensor of claim 1 in which said filter is transmissive to infrared radiation having a wavelength between about 3 and about 14 microns.

9. The sensor of claim 1 in combination with an arc welding torch on which said sensor is mounted.

10. The sensor of claim 1 further including optical directing means for receiving infrared radiation from said vicinity of said arc and redirecting it to said detection means.

11. An electric arc torch welding system in which an electric welding arc is struck between a torch and a workpiece, said system comprising:
   an electric arc torch for producing said electric welding arc;
   infrared detection means for receiving infrared radiation from the vicinity of the arc produced by said torch, said infrared detection means thereby producing electrical signals in response to the intensity of infrared radiation impinging upon said detection means; and
   filter means disposed with respect to said detection means so that said infrared radiation impinging upon said detection means passes through said filter means, said filter means selectively passing infrared radiation having a wavelength greater than about 3 microns, whereby emitted rather than reflected radiation is detected from the vicinity of the welding arc.

* * * * *